United States Patent [19]

Chen et al.

[11] Patent Number: 5,384,235
[45] Date of Patent: Jan. 24, 1995

[54] PHOTOGRAPHIC ELEMENTS INCORPORATING POLYMERIC ULTRAVIOLET ABSORBERS

[75] Inventors: Tien-Teh Chen; Edward Schofield, both of Penfield; Hwei-Ling Yau; Lal C. Vishwakarma, both of Rochester, all of N.Y.

[73] Assignee: Eastman Kodak Company, Rochester, N.Y.

[21] Appl. No.: 907,008

[22] Filed: Jul. 1, 1992

[51] Int. Cl.$^6$ ............... G03C 1/815; G03C 1/825
[52] U.S. Cl. .................. 430/512; 430/381; 430/384; 430/385; 430/505; 430/548; 430/552; 430/553; 430/558; 430/931
[58] Field of Search ............... 430/510, 512, 517, 931, 430/381, 384, 385, 505, 548, 557, 555, 558

[56] References Cited

U.S. PATENT DOCUMENTS

| | | | |
|---|---|---|---|
| 3,072,585 | 1/1963 | Milionis et al. | 260/22 |
| 3,215,530 | 11/1965 | Riebel et al. | 96/48 |
| 3,253,921 | 5/1966 | Sawdey et al. | 96/73 |
| 3,278,448 | 10/1966 | Lauerer et al. | 252/300 |
| 3,352,681 | 11/1967 | Ohi et al. | 96/84 |
| 3,705,805 | 12/1972 | Nittel et al. | 96/84 |
| 3,707,375 | 12/1972 | Ohi et al. | 96/84 |
| 3,738,837 | 6/1973 | Kuwabara et al. | 96/84 |
| 3,745,010 | 7/1973 | Janssens et al. | 96/84 |
| 3,761,272 | 9/1973 | Mannens et al. | 96/84 |
| 3,813,255 | 5/1974 | Mannens et al. | 117/33.3 |
| 4,045,229 | 8/1977 | Weber, II et al. | 96/84 |
| 4,307,184 | 12/1981 | Beretta et al. | 430/512 |
| 4,340,664 | 7/1982 | Monbaliu et al. | 430/449 |
| 4,455,368 | 6/1984 | Kojima et al. | 430/507 |
| 4,464,462 | 8/1984 | Sugimoto et al. | 430/512 |
| 4,496,650 | 1/1985 | Yagihara et al. | 430/381 |
| 4,513,080 | 4/1985 | Helling | 430/537 |
| 4,528,311 | 7/1985 | Beard et al. | 524/91 |
| 4,611,061 | 9/1986 | Beard et al. | 548/260 |
| 4,663,272 | 5/1987 | Nakamura et al. | 430/542 |
| 4,716,234 | 12/1987 | Dunks et al. | 548/259 |
| 4,752,298 | 6/1988 | Burglin et al. | 8/527 |
| 4,785,063 | 11/1988 | Slongo et al. | 526/259 |
| 4,790,959 | 12/1988 | Sasaki et al. | 252/589 |
| 4,853,471 | 8/1989 | Rody et al. | 548/261 |
| 4,865,957 | 9/1989 | Sakai et al. | 430/505 |
| 4,943,519 | 7/1990 | Helling et al. | 430/512 |
| 4,973,702 | 11/1990 | Rody et al. | 548/261 |
| 5,032,498 | 7/1991 | Rody et al. | 430/512 |
| 5,084,375 | 1/1992 | Umemoto et al. | 430/505 |

FOREIGN PATENT DOCUMENTS

| | | |
|---|---|---|
| 0057160 | 1/1982 | European Pat. Off. . |
| 0131468 | 7/1984 | European Pat. Off. . |
| 0190003 | 1/1986 | European Pat. Off. ..... G03C 1/815 |
| 2096034 | 2/1972 | France . |
| 1338265 | 11/1973 | United Kingdom .......... G03C 7/00 |
| 1346764 | 2/1974 | United Kingdom .......... G03C 1/00 |
| 1504950 | 3/1978 | United Kingdom ............ C08J 3/20 |

OTHER PUBLICATIONS

BE-833-510 (Abstract).
JP-63055542 A2 (Abstract).

*Primary Examiner*—Jack P. Brammer
*Attorney, Agent, or Firm*—Gordon M. Stewart

[57] ABSTRACT

A photographic element with particular polymeric ultraviolet absorbers. The ultraviolet absorbers have repeating units of the formula:

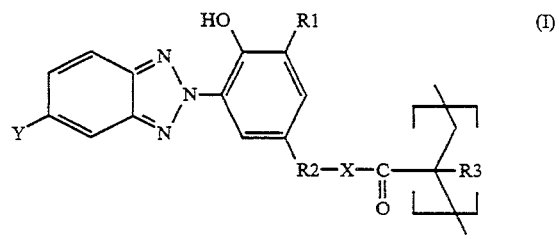

wherein:
X is O or NH;
Y is H or halogen;
$R_1$ is selected from the group consisting of H, halogen, alkoxy, straight chain or branched alkyl group of 1 to 8 carbons;
$R_2$ is $C_2$–$C_{10}$ alkylene which may be straight chain or branched; and
$R_3$ is H or $CH_3$.

Elements of the invention have good fresh Dmin and image dye stability, and the ultraviolet absorbers therein are highly light stable.

13 Claims, 1 Drawing Sheet

PHOTOGRAPHIC ELEMENTS INCORPORATING POLYMERIC ULTRAVIOLET ABSORBERS

FIELD OF THE INVENTION

This invention relates to photographic elements which incorporate a polymeric ultraviolet absorber of defined structure, such ultraviolet absorber itself being particularly stable to the action of ultraviolet light so as to not significantly contribute to stain while protecting other components from the action of ultraviolet light.

BACKGROUND OF THE INVENTION

Typical photographic elements use silver halide emulsions, the silver halide having a native sensitivity to ultraviolet UV radiation ("UV"). Such UV sensitivity is usually undesirable in that it produces an image on the photographic element which is not visible to the human eye. In addition, in the case of color photographic elements, in particular, color dye images formed on the light sensitive emulsion layers by color development easily undergo fading or discoloration due to the action of UV. Also, color formers, or so-called couplers, remaining in the emulsion layers are subject to the action of UV to form undesirable color stains on the finished photographs. The fading and the discoloration of the color images are easily caused by UV of wavelengths near the visible region, namely, those of wavelengths from 300 to 400 nm. For the foregoing reasons, photographic elements typically incorporate a UV absorbing material in an uppermost layer (that is, the layer that will first receive radiation when the element is in normal use).

Many types of UV absorbing materials have been described previously, and include those described in U.S. Pat. Nos. 3,215,530, 3,707,375, 3,705,805, 3,352,681, 3,278,448, 3,253,921, and 3,738,837, 4,045,229, 4,790,959, 4,853,471, 4,865,957, and 4,752,298, and United Kingdom Patent 1,338,265. Known UV absorbing materials often have many undesirable characteristics. For example, they tend to color and form stains due to their insufficient stability to UV, heat, and humidity. Also, a high-boiling organic solvent is usually required for the emulsification of the UV absorbing agents, which softens the layer and substantially deteriorates interlayer adhesion. In order to prevent these problems, a large amount of gelatin has been used in the layer containing the UV absorbent, resulting in a layer which may be unstable. Alternatively, a separate gelatin protective layer was provided over the UV absorbent containing layer. Such approach results in an undesirable thickening of the element. Furthermore, previously known UV absorbing agents, when provided in the uppermost layer of a photographic element, often migrate and crystallize at the surface of the layer. Thus, a gel overcoat would be used to minimize this undesirable blooming phenomenon. Furthermore, the droplets of such UV absorbing materials, when prepared by the conventional emulsification method described above, usually have particle sizes greater than 200 nm thereby producing light scattering with resulting deterioration of the element's photographic properties. The toxicity of such UV absorbing agents has also become an important issue recently.

It is known that polymer latexes obtained by polymerization of UV absorbing monomers, can be utilized as UV absorbing agents which do not have many of the disadvantages described above. At least three methods of adding polymeric UV absorbing agents in the form of latex to hydrophilic colloid composition, are known. The first method comprises adding a latex prepared by emulsion polymerization directly to a gelatin-containing silver halide emulsion. Emulsion polymerization is well known in the art and is described in F. A. Bovey, *Emulsion Polymerization*, issued by Interscience Publishers Inc. New York, 1955. This is the most direct way of preparing a polymer latex.

The second method of forming a polymer latex is by solution polymerization of monomer mixture comprising UV absorbing monomer and hydrophobic comonomers. An organic solvent is used for dissolving the hydrophobic polymeric UV absorbing agent and the solution is dispersed in an aqueous solution of gelatin in the form of latex. Polymeric UV absorbing polymer latexes prepared by the foregoing two processes have been described in, for example, U.S. Pat. Nos. 3,761,272; 3,745,010; 4,307,184; 4,455,368; 4,464,462; 4,513,080; 4,340,664; GB 1,504,949; GB 1,504,950; British Patent 1,346,764; EP Application 0 190 003 and others. The third method of forming polymer latex is by solution polymerization of a monomeric mixture of UV absorbing monomer, a comonomer, and an ionic comonomer containing sulfonic, sulfuric, sulfinic, carboxylic or phosphoric acid, and their metal salts, such as acrylamido -2,2'-dimethyl-propane sulfonic acid, 2-sulfoethyl methacrylate, or sodium styrene sulfonate. The polymer solution obtained is then dispersed in aqueous solution and forms a latex.

Although the UV absorbing polymer latexes previously known have several advantages as described above, they also have the following problems.

1. The polymeric UV absorbing agent itself is not sufficiently stable to UV, heat, and humidity resulting in lowered UV protection for the element.

2. Some polymeric UV absorbing agents absorb light beyond 400 nm and cause yellow coloration which is particularly objectionable in unexposed areas of the photographic elements.

3. The UV absorbing monomers have low solubility and very poor polymerization ability.

4. The absorption characteristics and the extinction coefficient in the range of 300 nm to 400 nm is poor. This contributes to light induced stain and poor protection of the image dyes from fading upon exposure to sunlight.

UV absorbers for plastic materials, are well known. For example, U.S. Pat. No. 4,528,311 describes a UV absorbing polymer compositions comprising copolymers of 2-hydroxy-5-acrylyloxyalkylphenyl-2H-benzotriazoles which are used in the manufacture of intraocular lenses and contact lenses. The monomer is incorporated into the lens forming polymer to provide UV absorbing properties. However, UV absorbers which may be effective in one environment, such as in the plastic of an intraocular lens, may not be effective in a totally different environment such as the hydrophilic colloidal gelatin layer of a photographic element.

It would therefore be desirable to provide a photographic element containing a polymeric UV absorber, which absorber is itself relatively stable in the typical photographic element environment, which is readily produced by polymerization from the monomer, and which has a high extinction coefficient in the 300 nm to 400 nm range while not significantly absorbing light beyond 400 nm, and which provides good UV protection of image dyes from exposure to UV.

SUMMARY OF THE INVENTION

The present invention provides a photographic element which has a hydrophilic colloidal dispersion layer (typically a gelatin layer) containing a UV absorber in the form of a polymer having repeating units of the following formula (I):

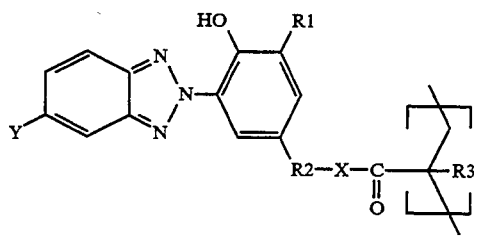

wherein:
X is O or NH;
Y is H or halogen;
$R_1$ is selected from the group consisting of H, halogen, alkoxy, straight chain or branched alkyl group of 1 to 8 carbons;
$R_2$ is $C_2$–$C_{10}$ alkylene which may be straight chain or branched; and
$R_3$ is H or $CH_3$.

DRAWING

FIG. 1 is an absorption spectrum of polymer P-2 suitable for use in photographic elements of the present invention, as described under the Preparative Examples.

DETAILED DESCRIPTION OF EMBODIMENTS OF THE INVENTION

Figure 1:
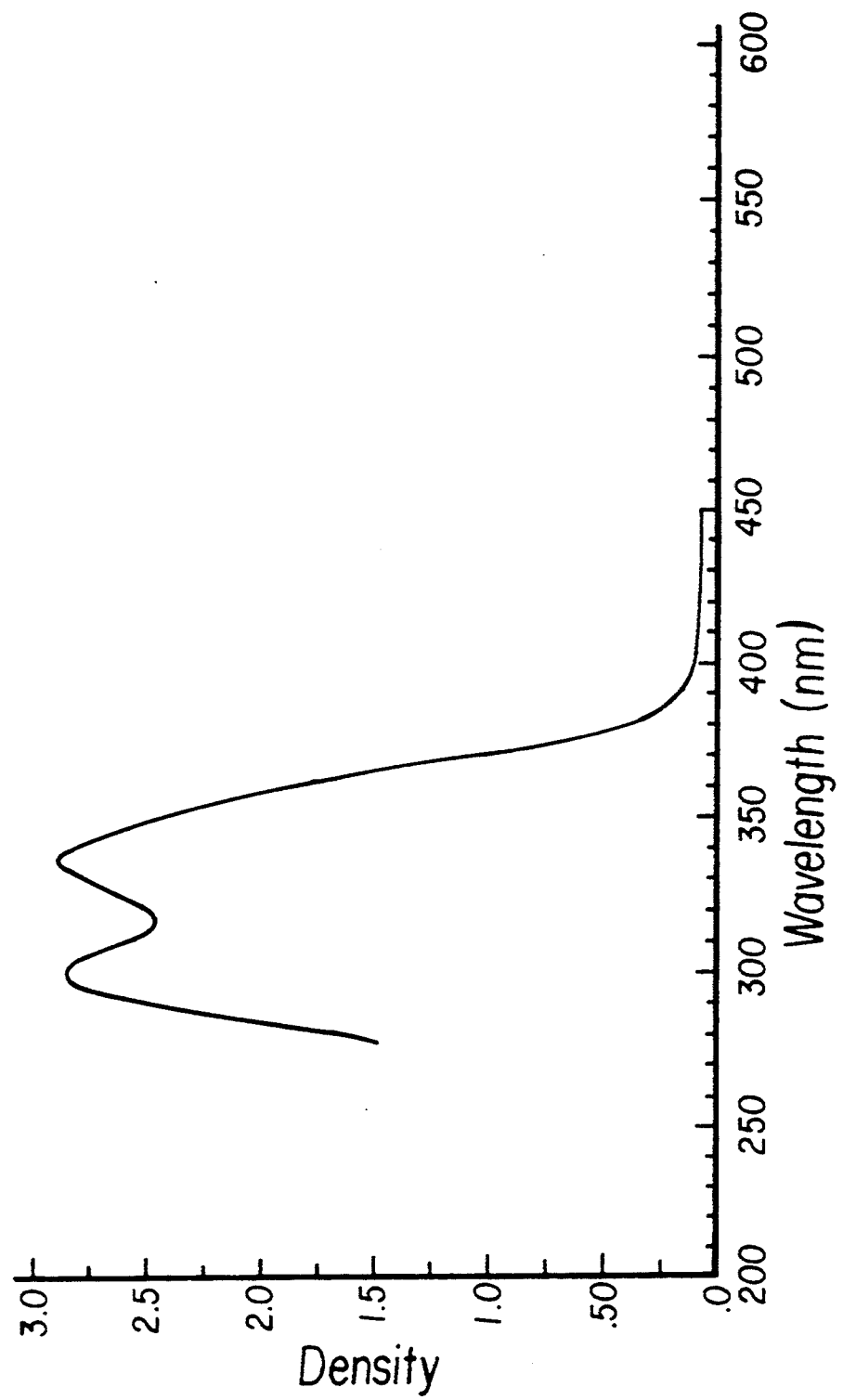

In one construction of photographic elements of the present invention, the hydrophilic colloidal dispersion layer containing the UV absorber described above, is a UV filter layer which is positioned above all light sensitive layers of the element (that is, closer to the light source than all the light sensitive layers when the element is in normal use). However, photographic elements of the present invention can be constructed with the a UV absorbing polymer latex of formula I by adding that polymer latex to any one or more of the layers (for example, a hydrophilic colloid layer) of a photographic light-sensitive material (for example, a silver halide photographic light-sensitive material), such as a surface protective layer, an intermediate layer or a silver halide emulsion layer, and the like. For example, in photographic paper the UV absorbing polymer latex may be positioned above and/or below the red sensitive layer (typically adjacent to it), or even completely or partially within the cyan layer. By a "latex" is meant a dispersion of polymer particles in a liquid, gel or the like.

It will be appreciated that the polymers of structure I above are conveniently produced by polymerization from the corresponding unsaturated monomer of the general formula II:

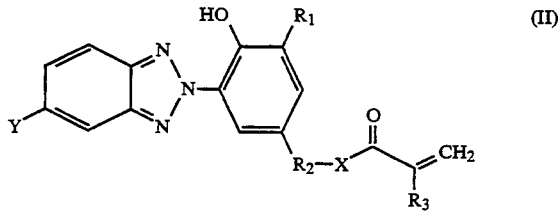

In the above formula, Y, R1, R2, X and R3 have the same meaning as in formula I. Examples of such monomers for preparing the corresponding polymers used in photographic elements of the present invention, include monomers M-1 through M-9 below:

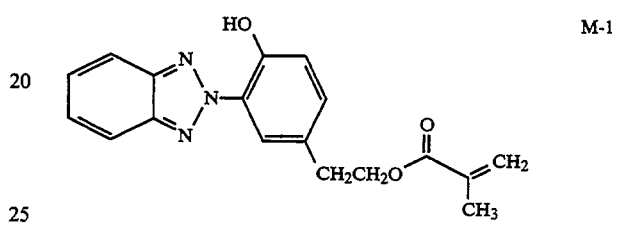

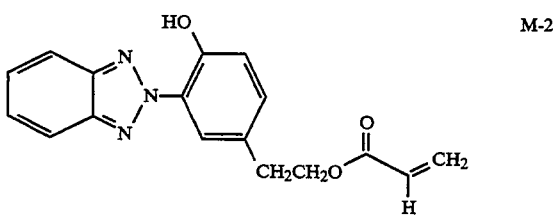

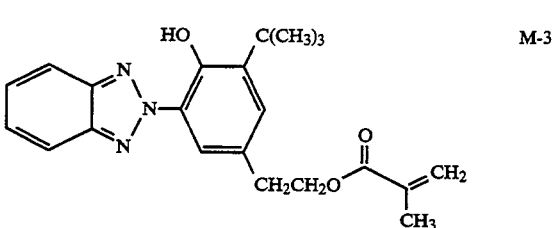

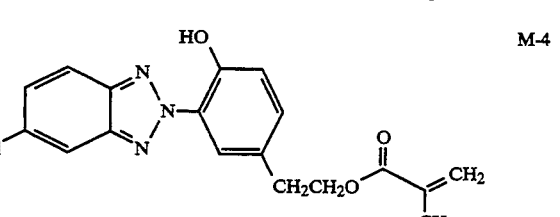

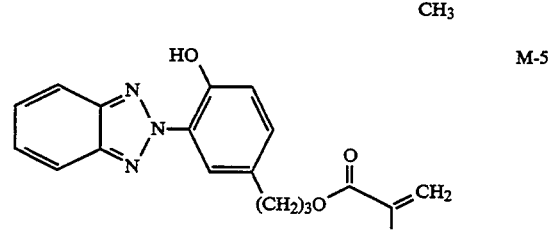

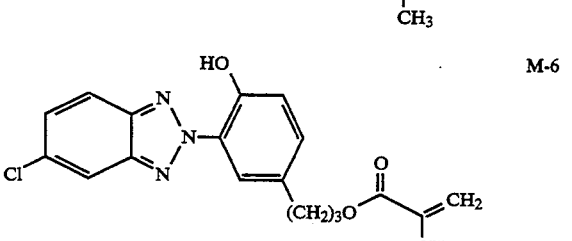

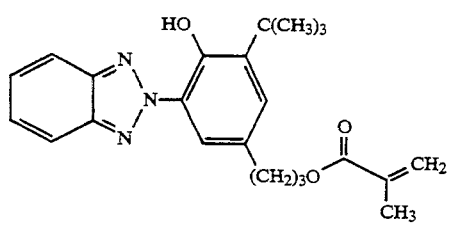

M-7

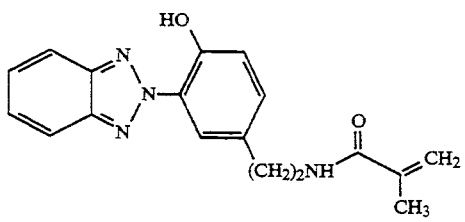

M-8

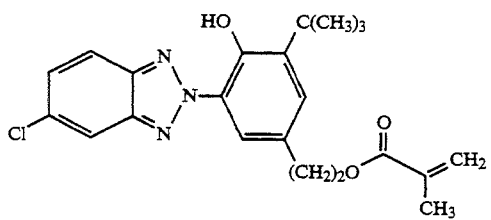

M-9

The above monomers can be polymerized to form the corresponding homopolymers, or they can be polymerized with other comonomers Examples of such other comonomers include: an acrylic acid, an a-alkylacrylacid (such as methacrylic acid, etc.), an ester or amide derived from an acrylic acid(for example, acrylamide, methacrylamide, n-butylacrylamide, t-butylacrylamide, diacetone acrylamide, methyl acrylate, ethyl acrylate, n-propylacrylate, n-butyl acrylate, t-butyl acrylate, isobutyl acrylate, 2-ethylhexyl acrylate, n-octyl acrylate, lauryl acrylate, 2-ethoxyethyl acrylate, 2-methoxyethyl acrylate, methyl methacrylate, ethyl methacrylate, n-butyl methacrylate, b-hydroxyl methacrylate, etc.), a vinyl ester(for example, vinyl acetate, vinyl propionate, vinyl laurate, etc.), acrylonitrile, methacrylonitrile, an aromatic vinyl compound (for example, styrene and a derivative thereof, for example, vinyl toluene, divinylbenzene, vinyl acetophenone, sulfostyrene, etc.), iraconic acid, citraconic acid, crotonic acid, vinylidene chloride, a vinyl alkyl ether(for example, vinyl ethyl ether, etc.), an ester of maleic acid, N-vinyl-2-pyrrolidone, N-vinylpyridine, 2- or 4-vinylpyridine, etc., an sulfonic acid containing monomers, (for example, acrylamido-2,2'-dimethylpropane sulfonic acid, 2-sulfoethyl methacrylate, 3-sulfopropyl methacylate, etc.). Of these monomers, esters of acrylic acid, esters of methacrylic acid, and aromatic vinyl compounds are preferred. Specific examples of preferred comonomers include: butyl acrylate; 2-ethylhexyl acrylate; 2-ethoxyethyl acrylate; 2-methoxyethyl acrylate; acrylic acid; methacrylic acid; acrylamide; 2-hydroxyethyl acrylate; vinyl acetate; styrene; N-vinyl-2-pyrrolidone; 2-sulfoethyl methacrylate and its metal salts; and 2-acrylamido-2-methyl propane sulfonic acid and its metal salts.

The photographic elements of the present invention may have UV absorbers which include, in addition to a repeating unit of formula I, two or more of the aforegoing comonomers. For example, a combination of butyl acrylate and acrylamido-2,2'- dimethyl propane sulfonic acid monomers can be copolymerized with a monomer of formula I. The UV absorbing polymers of photographic elements of the present invention, may have repeating units formed from two or more of the UV absorbing monomers of formula II. For example, a combination of M-1 with M-3 or with other UV absorbing monomers previously known. Furthermore, two or more of the UV absorbing polymers can be used together, for example, a combination of P-1 with P-22 (both described below) or with other UV absorbing polymeric agents described in the prior art.

Conventional UV absorbing agents can be loaded into the UV absorbing polymers of the photographic elements of the present invention to alter their photographic performance. "Loading" is described in U.S. Pat. No. 4,199,363 for example. Examples of such conventional UV absorbing agents which can be used include: 2-(2-hydroxy-5-methylphenyl)-2H-benzotriazole, 2-(2-hydroxy-3,5-di-tert-butylphenyl)-2H-benzotriazole, 2-(2-hydroxy-3-tert-butyl-5-methylphenyl)-2H-benzotriazole, 2-(2-hydroxy-3,5-di-tert-butylphenyl)-5-chloro-2H-benzotriazole, 2-(2-hydroxy-3,5-di-tert-amylphenyl)-2H-benzotriazole, 2-(2-hydroxy-3,5-di(1,1-dimethylbenzyl)-phenyl)-2H-benzotriazole, 2-(2-hydroxy-5-tert-octylphenyl)-2H-benzotriazole, and other types of UV absorbing agents such as p-hydroxybenzoates, phenylesters of benzoic acid, salicylanilides and oxanilides, diketones, benzylidene malonate, esters of 1-cyano-b-phenylcinnamic acid, and organic metal photostabilizers, and others, as described in J. F. Rabek, Photostabilization of Polymers, Principles and Applications, Elsevier Science Publishers LTD, England, page 202–278(1990).

High boiling point organic solvents can also be loaded into the polymeric UV absorbers in the photographic elements of the present invention to also alter their photographic performance. Examples of such high-boiling organic solvents include: tricresyl phosphate, di-n-butyl phthalate, N-n-amylphthalimide, bis(2-methoxyethyl)phthalate, dimethyl phthalate, ethyl N,N-di-n-butyl-carbamate, diethyl phthalate, n-butyl 2-methoxybenzoate, 2-(n-butoxyethyl) phthalate, ethyl benzylmalonate, n-amyl phthalate, n-hexyl benzoate, guaiacol acetate, tri-m-cresyl phosphate, diethyl sebacate, di-isoamyl phthalate, ethyl phenylacetate, phorone, di-n-butyl sebacate, dimethyl sebacate, N,N-diethyl lauramide, N,N-di-n-butyl lauramide, phenethyl benzoate, benzyl benzoate, dioctyl phthalate, dioctyl sebacate, quinitol bis(2-ethylhexoate), cresyl diphenyl phosphate, butyl cyclohexyl phthalate, tetrahydrofurfuryl adipate, tetrahydrofurfuryl benzoate, tetrahydrofurfuryl propionate, tetrahydrofurfuryl palmirate, guaiacol n-caproate, bis(tetrahydrofurfuryl)phthalate, N,N-diethylcapramide, 2,4-di-tert-amylphenol, 1-lauryl piperidine, N-n-butylacetanilide, N,N,N',N'-tetraethyl phthalamide, N,n-amylsuccinimide, diethyl citrate, 2,4-di-n-amylphenol, 1,4-cyclohexyllemedimethylene bis(2-ethylhexanoate), benzylbutyl phthalate, p-dodecylphenol, trihexylphosphate, isopropyl palamitate, and bis(2-ethylhexyl)sulfoxide, etc.

It is preferred that the photographic elements of the present invention have UV absorbing polymers in which the molar ratio of the amount of repeating units formed from a comonomer to the amount of repeating units of formula I, be from 0 to 10, and a molar ratio of from 0 to 5 is particularly preferred. The ethylenically unsaturated comonomer which is used to copolymerize with the UV absorbing monomer of formula (I), can be selected to impart desired physical and/or chemical properties to the copolymer to be prepared, for examples, glass transition temperature, particle size, compatibility with a binder such as gelatin or other photographic additives, for example, antioxidants and known color image forming agents, etc.

In making photographic elements of the present invention, the polymer latex may be formed by any of the known three methods described above. As described, the first method is by an emulsion polymerization method. Emulsion polymerization is well known in the art and is described in F. A. Bovey, *Emulsion Polymerization*, issued by Interscience Publishers Inc. New York, 1955. Examples of the chemical initiators which may be used include a thermally decomposable initiator, for examples, a persulfate (such as ammonium persulfate, potassium persulfate, etc), hydrogen peroxide, 4,4'-azobis(4-cyanovaleric acid), and redox initiators such as hydrogen peroxide-iron(II) salt, potassium persulfate-sodium hydrogensulfate, cerium salt-alcohol, etc. Emulsifiers which may be used in the emulsion polymerization include soap, a sulfonate(for example, sodium N-methyl-N-oleoyltaurate, etc.), a sulfate( for example, sodium dodecyl sulfate, etc.), a cationic compound(for example, hexadecyl trimethylammonium bromide, etc.), an amphoteric compound and a high molecular weight protective colloid(for example, polyvinyl alcohol, polyacrylic acid, gelatin, etc.). Specific examples and functions of the emulsifiers are described in *Belgische Chemische Industrie*, Vol.28, pages 16–20(1963). Emulsion polymerization of solid water-insoluble UV absorbing monomer is usually carried out in an aqueous system or a water/organic solvent system. Organic solvents which can be used are preferably those which have high water miscibility, are substantially inert to the monomers to be used, and do not interrupt usual reactions in free radical addition polymerization. Preferred examples include a lower alcohol having from 1 to 4 carbon atoms (for example, methanol, ethanol, isopropanol, etc.), a ketone(for example, acetone, etc.), a cyclic ether (for example, tetrahydrofuran, etc.), a nitrile (for example, acetonitrile,etc.), an amide(fro example, N,N-dimethylforamide, etc.), a sulfoxide (for example, dimethylsulfoxide), and the like. This method is the most direct way of preparing a polymer latex as described in U.S. Pat. Nos. 4,464,462; 4,455,368 and European Patent publication 0 190 003(1991).

For making photographic elements of the present invention, the second way of forming a polymer latex of the ultraviolet absorber is by solution polymerization of a monomer mixture of UV absorbing monomer (I) , a comonomer and an ionic comonomer containg sulfonic, sulfuric, sulfinic, carboxylic or phosphoric acid groups. Suitable ionic comonomers may include acrylamido-2,2'-dimethyl-propane sulfonic acid, 2-sulfoethyl methacrylate, or sodium styrene sulfonate. Examples of the chemical initiators commonly used include azo type initiators (for example, 2,2'-azobisisobutyronitrile, dimethyl 2,2'-azobisisobutyrate, 4,4'-azobis(4-cyanovaleric acid) and the like), and peroxide type initiators(for example, benzoyl peroxide, lauroyl peroxide, and the like). The polymer solution obtained is then dispersed in an aqueous solution with or without additional surfactants to form a latex.

The third way of forming an ultraviolet absorber polymer latex for photographic elements of the present invention, is by solution polymerization of a monomer mixture comprising UV absorbing monomer(I) and other comonomers. An organic solvent is used to dissolve the hydrophobic polymeric UV absorbing agent and the solution is dispersed in an aqueous solution of gelatin in the form of latex as described in U.S. Pat. No. 4,455,368(1984). The solvent is removed from the mixture prior to coating of the dispersion or by volatilization during drying of the dispersion coated, although the latter is less preferable. Solvents which may be used include those which have a certain degree of water solubility so as to be capable of being removed by washing with water in a gelatin noodle state, and those which can be removed by spray drying, vacuum or steam purging. Examples of the organic solvents capable of being removed include an ester (for example, ethyl acetate), a lower alkyl ether, a ketone, a halogenated hydrocarbon, an alcohol and a combination thereof. Any type of dispersing agent can be used in the dispersion of the hydrophobic polymeric UV absorbing agent. However, ionic surface active agents, and particularly anionic surface active agents, are preferred. In order to increase the dispersion stability and sometimes improve the photographic performance of the polymeric UV absorbing agent, a small amount of a high-boiling point organic solvent, for example, dibutyl phthalate, tricresyl phosphate, p-dodecyl phenol, 1,4-cyclohexylenedimethylene bis(2-ethylhexanoate), and the like may be added. It is preferred that the amount thereof is as small as possible so as to decrease the thickness of the final emulsion layer or the hydrophilic colloid layer in order to maintain good sharpness.

Some examples of particular polymeric UV absorbers which may be used in photographic elements of the present invention are provided below as formulae P-1 to P-27. Formula P-13 is a homopolymer whereas the remainder are copolymers. The formulae are based on molar ratios of monomers.

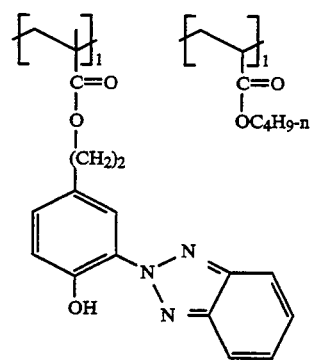

P-1

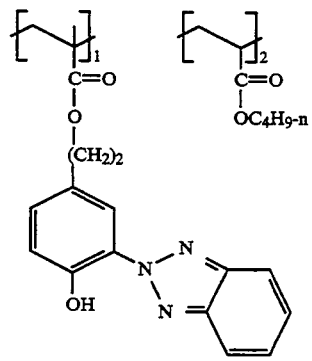

P-2

-continued
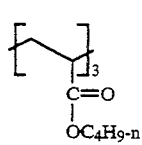 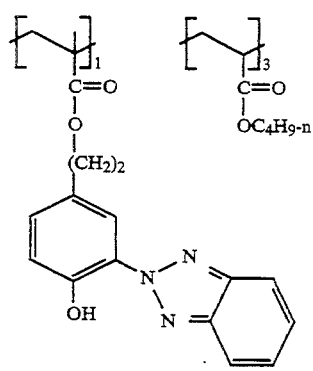 P-3
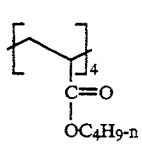 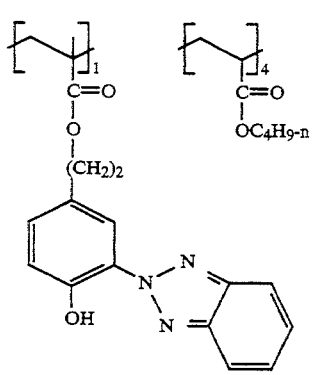 P-4
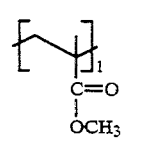 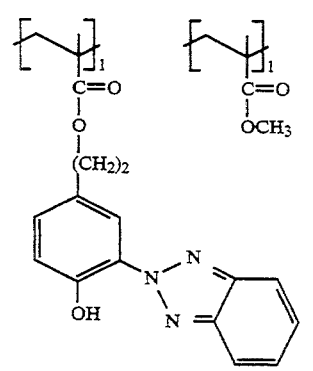 P-5
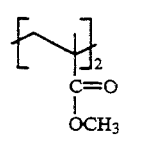 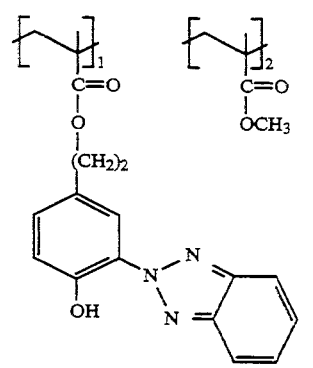 P-6
-continued
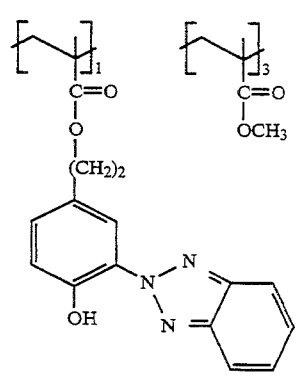 P-7
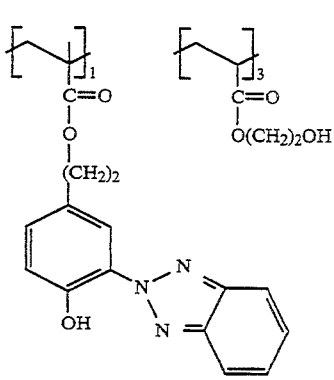 P-8
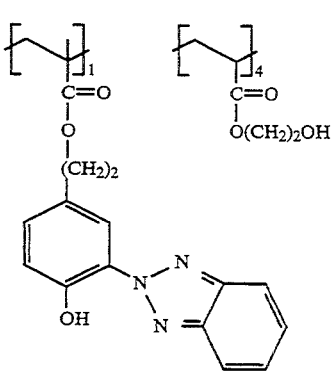 P-9
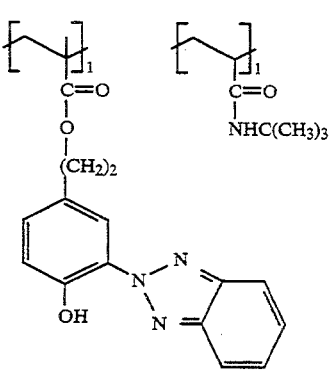 P-10

-continued
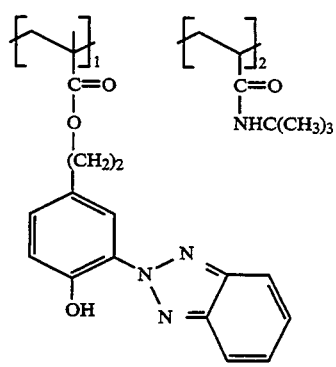 P-11
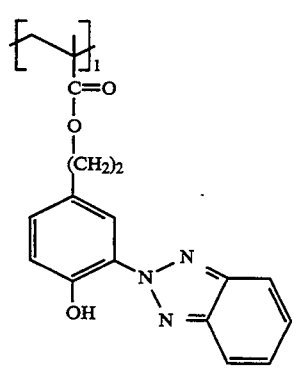 P-12
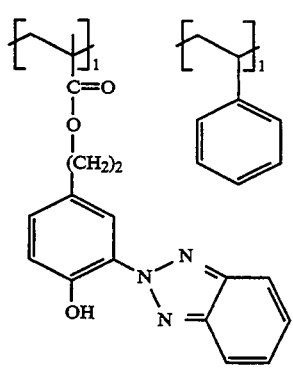 P-13
P-14
-continued
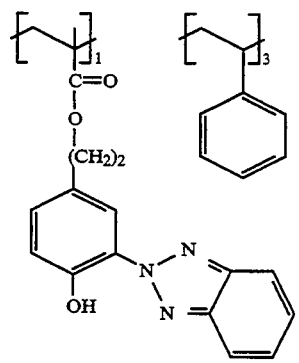 P-15
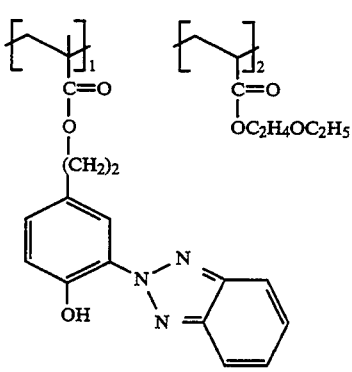 P-16
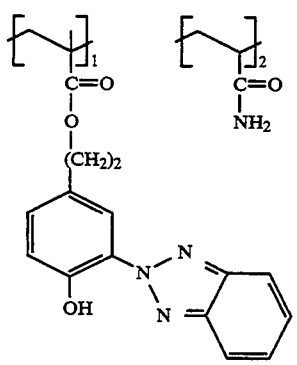 P-17
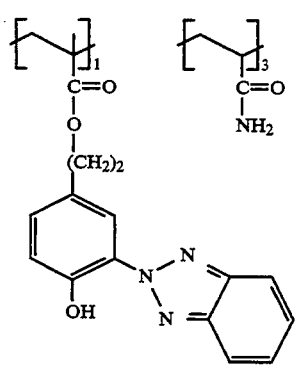 P-18

-continued
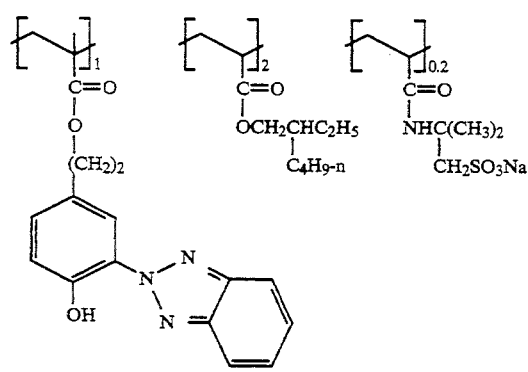
P-19
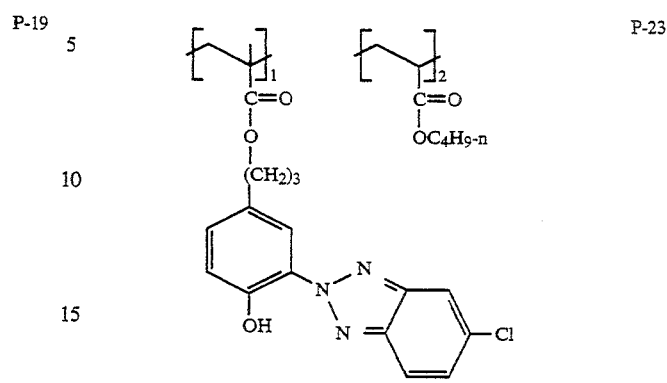
P-23
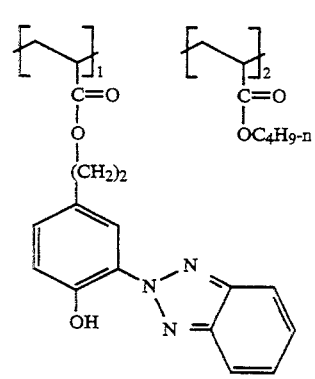
P-20
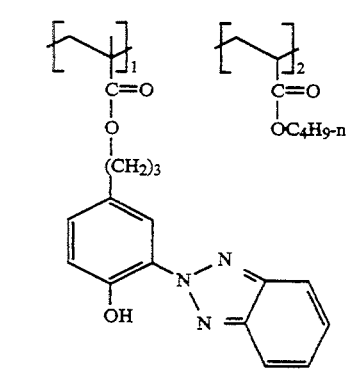
P-21
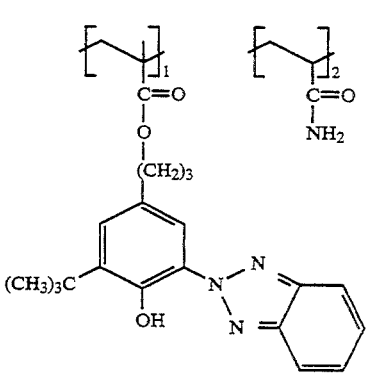
P-24
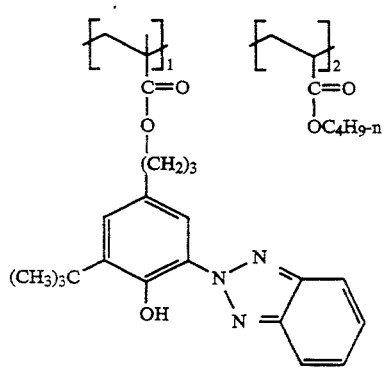
P-22
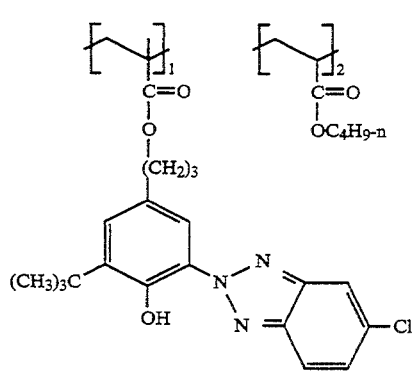
P-25
P-26

-continued

P-27

[structure of polymer P-27 showing three repeating units with subscripts 1, 2, and 0.2, with C=O groups; first unit has O-(CH₂)₂-phenyl-OH with N-N=cyclohexadiene substituent; second unit has OC₄H₉-n; third unit has NHC(CH₃)₂-CH₂SO₃Na]

The silver halide used in the photographic elements of the present invention may be silver bromoiodide, silver bromide, silver chloride, silver chlorobromide, and the like, which are provided in the form of an emulsion. The emulsions are typically sensitized with one or more sensitizing dyes, many of which are known to sensitize the emulsions for different wavelengths of light (for example, red, green and blue). The photographic elements of the present invention may use any type of grain crystal structure, including cubic or tabular grain emulsions. Tabular silver halide grains are grains having two substantially parallel crystal faces that are larger than any other surface on the grain. Tabular grain emulsions are those in which greater than 50 percent of the total projected area of the emulsion grains are accounted for by tabular grains having a thickness of less than 0.3 μm (0.5 μm for blue sensitive emulsion) and an average tabularity (T) of greater than 25 (preferably greater than 100), where the term "tabularity" is employed in its art recognized usage as $$T = ECD/t^2$$

where

ECD is the average equivalent circular diameter of the tabular grains in μm and t is the average thickness in μm of the tabular grains. The grain size of the silver halide may have any distribution known to be useful in photographic compositions, and may be either polydispersed or monodispersed.

The silver halide grains to be used in the invention may be prepared according to methods known in the art, such as those described in Research Disclosure, (Kenneth Mason Publications Ltd, Emsworth, England) Item 308119, December, 1989 (hereinafter referred to as Research Disclosure I) and James, The Theory of the Photographic Process. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in Research Disclosure I and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in Research Disclosure I. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in Research Disclosure I. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in Research Disclosure, June 1975, item 13452 and U.S. Pat. No. 3,772,031.

As mentioned, the silver halide may be sensitized by dyes by any method known in the art, such as described in Research Disclosure I. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (for example, 2 hours). The above-described sensitizing dyes can be used alone, or may be used in combination with other sensitizing dyes, e.g. to also provide the silver halide with sensitivity to wavelengths of light outside the green region or to supersensitize the silver halide. Essentially any type of emulsion (e.g., negative-working emulsions such as surface-sensitive emulsions of unfogged internal latent image-forming emulsions, direct-positive emulsions such as surface fogged emulsions, or others described in, for example, Research Disclosure I) may be used. Thus, the elements of the present invention include silver halide color papers, color negatives, and color reversal systems (that is, slide systems). Photographic elements using the described polymers may also be usefully constructed which do not have a hydrophilic colloidal dispersion layer. For example, dye transfer systems including thermal of pH activated systems such as described in D. J. P. Harrison, Proceedings of the Society of Photographical Instrumentation Engineers Vol. 1079, p. 215–222 (1989), and James The Theory of the Photographic Process 4th ed., 1977, Eastman Kodak Company, Rochester, New York. Other photographic elements include heat developable silver based systems, for example as in U.S. Pat. Nos. 4,584,267 and 4,948,698 and references therein.

Other addenda in the emulsion may include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. Many of the foregoing addenda may also be used in a non-light sensitive ultraviolet filter layer which is situated above all of the light sensitive layers. These addenda and methods of their inclusion in emulsion and other photographic layers are well-known in the art and are disclosed in *Research Disclosure I* and the references cited therein. The emulsion may also include brighteners, such as stilbene brighteners. Such brighteners are well-known in the art and are used to counteract dye stain, although the dyes of the present invention generally have low dye stain even if no brightener is used.

A layer containing the polymeric absorber dye can be coated simultaneously or sequentially with other layers, including emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, and the like. The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements of the present invention can be black and white but are preferably color. A color photographic element generally contains three silver emulsion layers or sets of layers (each set of layers often consisting of emulsions of the same spectral sensitivity but different speed): a blue-sensitive layer having a yellow dye-forming color coupler associated therewith; a green-sensitive layer having a magenta dye-forming color coupler associated therewith; and a red-sensitive layer having a cyan dye-forming color coupler associated therewith. Those dye forming couplers are provided in the emulsion typically by first dissolving or dispersing them in a water immiscible, high boiling point organic solvent, the resulting mixture then being dispersed in the emulsion. Suitable solvents include those in European Patent Application 87119271.2. Dye-forming couplers are well-known in the art and are disclosed, for example, in *Research Disclosure I*.

Photographic elements of the present invention which contain polymeric UV absorbers of structure I, can be processed in any of a number of well-known photographic processes utilizing any of a number of well-known processing compositions, described, for example, in *Research Disclosure I*, or in James, *The Theory of the Photographic Process* 4th, 1977.

The invention is described further in the following Examples.

Preparative Examples

A number of examples of synthesis of polymers used in photographic elements of the present invention, are provided below. Preparations are also provided for comparative UV absorbing compositions which, when incorporated into photographic elements without polymers having repeating units of formula I, do not produce photographic elements of the present invention. Such comparative compositions are identified as C-1 through C-12. Compositions C-1 and C-2 are conventional dispersions of monomeric UV absorbers, whereas C-3 through C-12 are latexes of polymers which, when incorporated into photographic elements without polymers having repeating units of formula I, do not produce elements of the present invention. The starting monomers of formula II can be obtained by syntheses analogous to the monomer synthesis described in U.S. Pat. No. 4,528,311 or S. Tanimoto and Y. Inoue, *Bulletin Institute Chemical Research* Vol. 68 No. 5-6, p. 309-320 (1991).

Synthesis of Polymer P-2

388 mL of deionized water, 4.34 g of 20% sodium N-methyl-N-oleoyltaurate (Igepon T-77), and 40 mL of acetone were mixed in a 1 L 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 9.69 g of M-1(0.03 mole), 7.692 g of butyl acrylate (0.06 mole) and 194 mL of N,N-dimethylforamide. 6.95 g of 5% ammonium persulfate was added to the reactor and stirred for 3 mins. The monomer solution was pumped into the reactor over 4½ hours. The polymerization was continued for 8 hours. The latex was cooled, filtered and dialyzed against distilled water overnight. The latex was then concentrated to 8.14% solid with Amicon's Ultrafiltration unit. The Z-average particle size measured by Malvern's Autosizer IIC was 52 nm. The elemental analysis of nitrogen was 7.22% The absorption spectrum is shown in FIG. 1.

Synthesis of Polymer P-1

260 g of deionized water, 2.26 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 2.56 g of butyl acrylate (0.02 mole) and 130 mL of N,N-dimethylforamide. The co-feed solution was made of 0.9 g of IgeponT-77(20%), 1.8 g of ammonium persulfate, and 20 g of deionized water. 3.61 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 5.0% solid with Amicon's Ultrafiltration unit. The Z-average particle size measured by Malvern's Autosizer IIC was 49 nm. The elemental analysis result was N(9.11%), C(63.44%), and H(6.60%).

Synthesis of Polymer P-3

260 g of deionized water, 3.54 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 7.69 g of butyl acrylate (0.06 mole) and 130 mL of N,N-dimethylforamide. The co-feed solution was made of 1.42 g of IgeponT-77(20%), 2.83 g of ammonium persulfate, and 20 g of deionized water. 5.66 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 5.62% solid with Amicon's Ultrafiltration unit. The Z-average particle size measured by Malvern's Autosizer IIC was 59.3 nm. The elemental analysis result was N(5.79%), C(64.55%), and H(7.54%).

Synthesis of Polymer P-4

260 g of deionized water, 4.18 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 10.256 g of butyl acrylate (0.08 mole) and 130 mL of N,N-dimethylforamide. The co-feed solution was made of 2.22 g of IgeponT-77(20%), 3.34 g of ammonium persulfate, and 20 g of deionized water. 6.69 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 6.1% solid with Amicon's Ultrafiltration unit. The Z-average particle size measured by Malvern's Autosizer IIC was 56.8 nm. The elemental analysis result was N(5.03%), C(66.09%), and H(7.84%).

Synthesis of Polymer P-5

260 g of deionized water, 2.12 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 2.0 g of methyl methacrylate (0.02 mole) and 130 mL of N,N-dimethylforamide. The co-feed solution was made of 0.85 g of IgeponT-77(20%), 1.69 g of ammonium persulfate, and 20 g of deionized water. 3.38 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 5.01% solid with Amicon's Ultrafiltration unit. The Z-average particle size measured by Malvern's Autosizer IIC was 79.6 nm. The elemental analysis results were N(10.09%), C(64.38%), and H(6.04%).

Synthesis of Polymer P-6

260 g of deionized water, 2.62 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 4.0 g of methyl methacrylate (0.04 mole) and 130 mL of N,N-dimethylforamide. The co-feed solution was made of 1.05 g of IgeponT-77(20%), 2.09 g of ammonium persulfate, and 20 g of deionized water. 4.19 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled waterovernight. The latex was then concentrated to 4.65% solid with Amicon's Ultrafiltration unit. The Z-average particle size measured by Malvern's Autosizer IIC was 56.1 nm. The elemental analysis result was N(8.77%), C(61.39%), and H(6.42%).

Synthesis of Polymer P-7

260 g of deionized water, 3.12 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 6.0 g of methyl methacrylate (0.06 mole) and 130 mL of N,N-dimethylforamide. The co-feed solution was made of 1.25 g of IgeponT-77(20%), 2.49 g of ammonium persulfate, and 20 g of deionized water. 4.99 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 3.77% solid with Amicon's Ultrafiltration unit. The Z-average particle size measured by Malvern's Autosizer IIC was 35 nm. The elemental analysis result was N(7.25%), C(61.46%), and H(6.83%).

Synthesis of Polymer P-8

260 g of deionized water, 3.78 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 8.652 g of 2-ethoxyethyl acrylate(0.06 mole) and 130 mL of N,N-dimethylforamide. The co-feed solution was made of 1.51 g of IgeponT-77(20%), 3.02 g of ammonium persulfate, and 20 g of deionized water. 6.04 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 4.54% solid with Amicon's Ultrafiltration unit. The Z-average particle size measured by Malvern's Autosizer IIC was 79.1 nm. The elemental analysis result was N(6.2%), C(61.9%), and H(7.0%).

Synthesis of Polymer P-9

260 g of deionized water, 4.38 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 9.29 g of 2-hydroxyethyl-acrylate (0.08 mole) and 130 mL of N,N-dimethylforamide. The co-feed solution was made of 1.75 g of IgeponT-77(20%), 3.5 g of ammonium persulfate, and 20 g of deionized water. 7.01 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 6.2% solid with Amicon's Ultrafiltration unit. The Z-average particle size measured by Malvern's Autosizer IIC was 48.6 nm. The elemental analysis results were N(5.33%), C(57.93%), and H(6.27%).

Synthesis of Polymer P-10

260 g of deionized water, 2.25 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 2,544 g of t-butylacrylamide(0.02 mole) and 130 mL of N,N-dimethylforamide. The co-feed solution was made of 0.9 g of IgeponT-77(20%), 1.8 g of ammonium persulfate, and 20 g of deionized water. 3.6 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 3.55% solid with Amicon's Ultrafiltration unit. The Z-average particle size measured by Malvern's Autosizer IIC was 79.1 nm. The elemental analysis results were N(12.08%), C(63.6%), and H(6.6%).

Synthesis of Polymer P-11

260 g of deionized water, 2.89 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 5,088 g of t-butylacrylamide(0.04 mole) and 130 mL of N,N-dimethylforamide. The co-feed solution was made of 1.15 g of IgeponT-77(20%), 2.31 g of ammonium persulfate, and 20 g of deionized water. 4.62 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 5.22% solid with Amicon's Ultrafiltration unit. The Z-average particle size measured by Malvern's Autosizer IIC was 81.7 nm. The elemental analysis results were N(11.43%), C(62.19%), and H(7.43%).

Synthesis of Polymer P-12

260 g of deionized water, 3.52 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole), 7.632 g of t-butylacrylamide(0.06 mole) and 130 mL of N,N-dimethylforamide. The co-feed solution was made of 1.41 g of IgeponT-77(20%), 2.82 g of ammonium persulfate, and 20 g of deionized water. 5.64 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 6.11% solid with Amicon's Ultrafiltration unit. The Z-average particle size measured by Malvern's Autosizer IIC was 106.5 nm. The elemental analysis results were N(11.72%), C(62.11%), and H(7.91%).

Synthesis of Polymer P-13

260 g of deionized water, 2.15 g of 20% sodium N-methyl-N-oleoyltaurate (Igepon T-77), and 26 g of acetone were mixed in a 500 mL 4-neck round bottom flask equipped with a mechanical stirrer, nitrogen inlet, and condenser. The flask was immersed in a constant temperature bath at 80° C. and heated for 30 mins with nitrogen purging through. The monomer solution was composed of 6.46 g of M-1(0.02 mole) and 130 mL of N,N-dimethylforamide. The co-feed solution was made of 0.8 g of IgeponT-77(20%), 1.3 g of 5% ammonium persulfate, and 20 g of deionized water. 2.59 g of 5% ammonium persulfate was added to the reactor and stirred for 3 mins. The monomer and co-feed solution were pumped into the reactor over 4 hours. The polymerization was continued for 8 hours. The latex was cooled, filtered and dialyzed against distilled water overnight. The latex was then concentrated to 6.05% solid with Amicon's Ultrafiltration unit. The Z-average particle size measured by Malvern's Autosizer IIC was 48.8 nm. The elemental analysis results were N(13%), C(66.8%), and H(5.8%).

Synthesis of Polymer P-27

A 250 ml 4-neck round bottom flask equipped with a mechanical stirrer, nitrogen inlet, and condenser was immersed in a constant temperature bath at 80° C.. Monomer solution comprising 6.46 g of M-i, 5,127 g of n-butyl acrylate, 0.92 g of 2-acrylamido-2-methyl-propane sulfonic acid(sodium salt) , 0.25 g of 2,2'-azobis(2-methylpropionitrile), and 50 ml of N,N-dimethylforamide was added in the reactor over 4 hours. 0.125 g of 2,2'-azobis(2-methylpropionitrile) in 2 ml of DMF was post-added and polymerized for two more hours. The polymer solution was diluted with 50 ml of methanol and dispersed in 200 ml of hot distilled water. The latex obtained was cooled, filtered and dialyzed against distilled water overnight. The latex was then concentrated to 5.6% solid with Amicon's Ultrafiltration unit. The Z-average particle size measured by Malvern's Autosizer IIC was 55.0 nm. The elemental analysis results were N(7.1%), C(64.1%), and H(7.0%).

Comparative C-1

This is a conventional dispersion composed of Tinuvin 328 (0.85), Tinuvin 326(0.15) (from Ciba-Geigy), 1,4-cyclohexylenedimethylene bis(2-ethylhexanoate) (0.33), 2,5-bis(1,1,3,3-tetramethylbutyl)-1,4-benzenediol (0.114), 10% Alkanol LC(0.555), and TCG2 Gel(0.708). The numbers inside the parethesis are the relative weight ratio. The dispersion was prepared by the colloid mill process in the presence of gelatin as known in the art. Average particle size is 273 nm.

Comparative C-2

This is a conventional dispersion composed of Tinuvin 328 (0.85), Tinuvin 326(0.15) (from Ciba-Geigy), 2,5-bis(1,1,3,3-tetramethylbutyl)-1,4-benzenediol (0.114), 10% Alkanol LC(0.555), and TCG2 Gel(0.708). The numbers inside parenthesis are the relative weight ratio. The dispersion was prepared by the colloid mill process in the presence of gelatin as known in the art. The average particle size is 550 nm. Structures of Tinuvin 328 and Tinuvin 326 are:

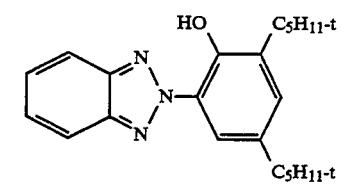
TINUVIN 328

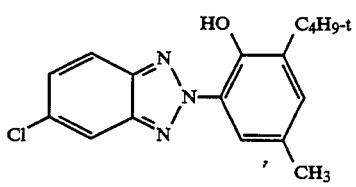
TINUVIN 326

Comparative Examples 3–12

Comparative examples 3 to 12 are copolymers which were synthesized from the UV absorbing monomers listed below. The polymers were synthesized by the same procedure as described in Example 1 except the listed UV absorbing monomers and comonomers were used. The structural formulae for the UV absorbing monomers (listed as UV3 through UV12 below) is provided below the table.

| Sample No. | UV Monomer | Comonomer | Molar Ratio |
|---|---|---|---|
| C-3 | UV3 | Methyl Methacrylate | 1:2 |
| C-4 | UV3 | t-Butyl Acrylamide | 1:2 |
| C-5 | UV5 | Butyl Acrylate | 1:2 |
| C-6 | UV6 | Butyl Acrylate | 1:2 |
| C-7 | UV7 | Butyl Acrylate | 1:2 |
| C-8 | UV8 | Butyl Acrylate | 1:2 |
| C-9 | UV9 | Butyl Acrylate | 1:2 |
| C-10 | UV10 | Butyl Acrylate | 1:2 |
| C-11 | UV11 | Butyl Acrylate | 1:2 |
| C-12 | UV12 | Butyl Acrylate | 1:2 |

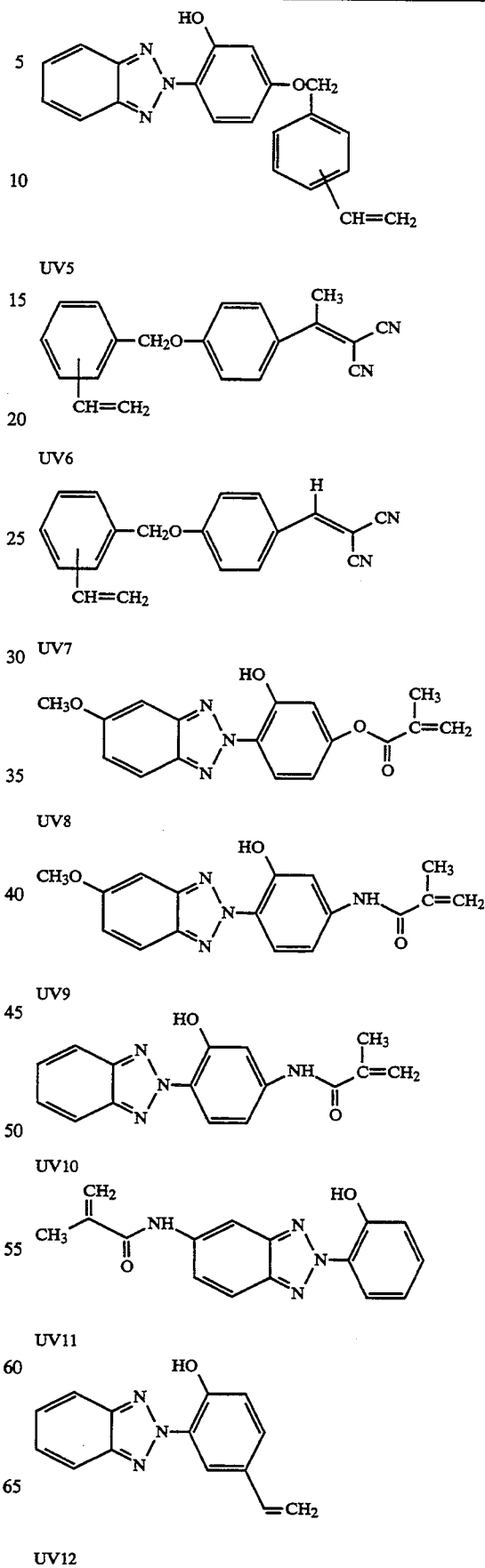

-continued

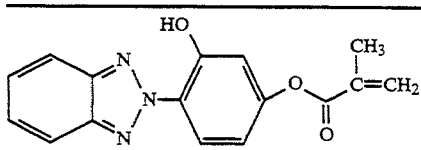

Photographic Examples

EXAMPLE 1

The light stability of UV absorbing agents themselves is very important for the protection of photographic materials from dye fade. The light stability of the polymeric UV absorbing agents incorporated in photographic elements of this invention was evaluated in comparison to photographic elements using comparative UV absorbing compounds. The coating format for comparative compositions C-1 and C-2 was as follows:

| | |
|---|---|
| Gel | 100 mg/ft$^2$ |
| BVSME* | 1.75 mg/ft$^2$ |
| Gel | 100 mg/ft$^2$ |
| UV Absorbing Agent | 0.17 mmole/ft$^2$ |
| Cellulose Triacetate Film Support | |

*BVSME - Bis(vinylsulfonyl methyl) Ether

Since polymeric UV absorbing agents do not bloom, the top overcoat can be eliminated. Therefore, the coating format for the polymeric UV absorbing agents of this invention and the comparative compositions was as follows:

| | |
|---|---|
| Gel | 100 mg/ft$^2$ |
| BVSME | 1.75 mg/ft$^2$ |
| UV Absorbing Agent | 0.17 mmole/ft$^2$ |
| Cellulose Triacetate Film Support | |

The light stability of the above coatings was evaluated using the typical Xenon fadeometer exposure with Xe arc lamp as a light source at 25° C. for two weeks. The samples were irradiated at a distance such that the irradiance on the sample was 50Klux. The UV absorption spectrum of each sample was taken both before and after irradiation, and the % loss of the absorbance at 360 nm was used as an index of light stability. The results are shown in Table 1.

TABLE 1

Light Stability of UV Absorbers

| Sample no. | % Loss at 360 nm | Remarks |
|---|---|---|
| C-1 | 9.44 | Comparative |
| C-3 | 25.83 | Comparative |
| C-4 | 32.64 | Comparative |
| C-5 | 64.2 | Comparative |
| C-6 | 74 | Comparative |
| C-7 | 23.85 | Comparative |
| C-8 | 53 | Comparative |
| C-9 | 14.73 | Comparative |
| C-11 | 14.76 | Comparative |
| P-1 | 3.69 | Invention |
| P-2 | 4.03 | Invention |
| P-3 | 4.6 | Invention |
| P-4 | 2.91 | Invention |
| P-5 | 3.92 | Invention |
| P-6 | 4.47 | Invention |
| P-7 | 2.67 | Invention |
| P-9 | 3.2 | Invention |

TABLE 1-continued

Light Stability of UV Absorbers

| Sample no. | % Loss at 360 nm | Remarks |
|---|---|---|
| P-10 | 4.74 | Invention |
| P-11 | 3.26 | Invention |
| P-12 | 4.91 | Invention |
| p-13 | 8.37 | Invention |
| P-16 | 3.42 | Invention |

Table 1 clearly demonstrates that photographic elements of this invention incorporating polymeric UV absorbers of formula I, have much better light stability over the comparative examples.

EXAMPLE 2

Photographic elements in the form of color photographic paper, were prepared with the layer arrangement shown below. Experiments were conducted on storage stability and absorption characteristics, as well as on light-induced discoloration of color forming dyes and the density at the unexposed area (that is, fresh Dmin). Elements of the present invention incorporating polymeric UV absorbers of formula I, as well as elements incorporating the comparative UV absorber compositions, were tested. Note that fresh Dmin should be as low as possible.

The protective layer shown in the layer arrangement below, was omitted if a polymeric UV absorber was used, which is another major advantage of this invention.

| Layer No. | Layer Name | Ingredients mg/ft$^2$ unless otherwise indicated |
|---|---|---|
| 8 (Optional) | Protective Layer | (This layer omitted when polymeric UV absorber used). |
| | | 125 Gelatin |
| 7 | UV Layer | 61 Gelatin |
| | | 0.17 mmole/ft$^2$ UV absorbing agent |
| 6 | Interlayer | 2.0 Scavenger 1 |
| | | 100 Gel |
| 5 | Cyan Layer | 100 Gelatin |
| | | 39.3 Cyan Coupler |
| | | 0.54 Scavenger 1 |
| | | 16.7 Red Sensitized AgCl Emulsion |
| | | 21.44 Coupler Solvent |
| 4 | Interlayer | 65.0 Gelatin |
| | | 4.02 Scavenger 1 |
| 3 | Magenta Layer | 115.0 Gelatin |
| | | 36.14 Magenta Coupler |
| | | 19.2 Magenta Stabilizer |
| | | 26.65 Green sensitized AgCl Emulsion |
| | | 14.25 Coupler Solvent |
| 2 | Interlayer | 70.0 Gelatin |
| | | 8.75 Scavenger 1 |
| 1 | Yellow Layer | 140.0 Gelatin |
| | | 68.03 Yellow Coupler |
| | | 23.63 Blue Sensitized AgCl Emulsion |
| | | 0.88 Scavenger 2 |
| Support | sublayer 1 | Resin Coat: Titanox and Optical Brightner Dispersed in Polyethylene |
| | sublayer 2 | Paper |
| | sublayer 3 | Resin Coat: Polyethylene |

All couplers, scavenger, and image stabilizers are co-dispersed in di-butyl phthalate (Coupler Solvent) by the conventional milled process. The structures of the foregoing are as follows:

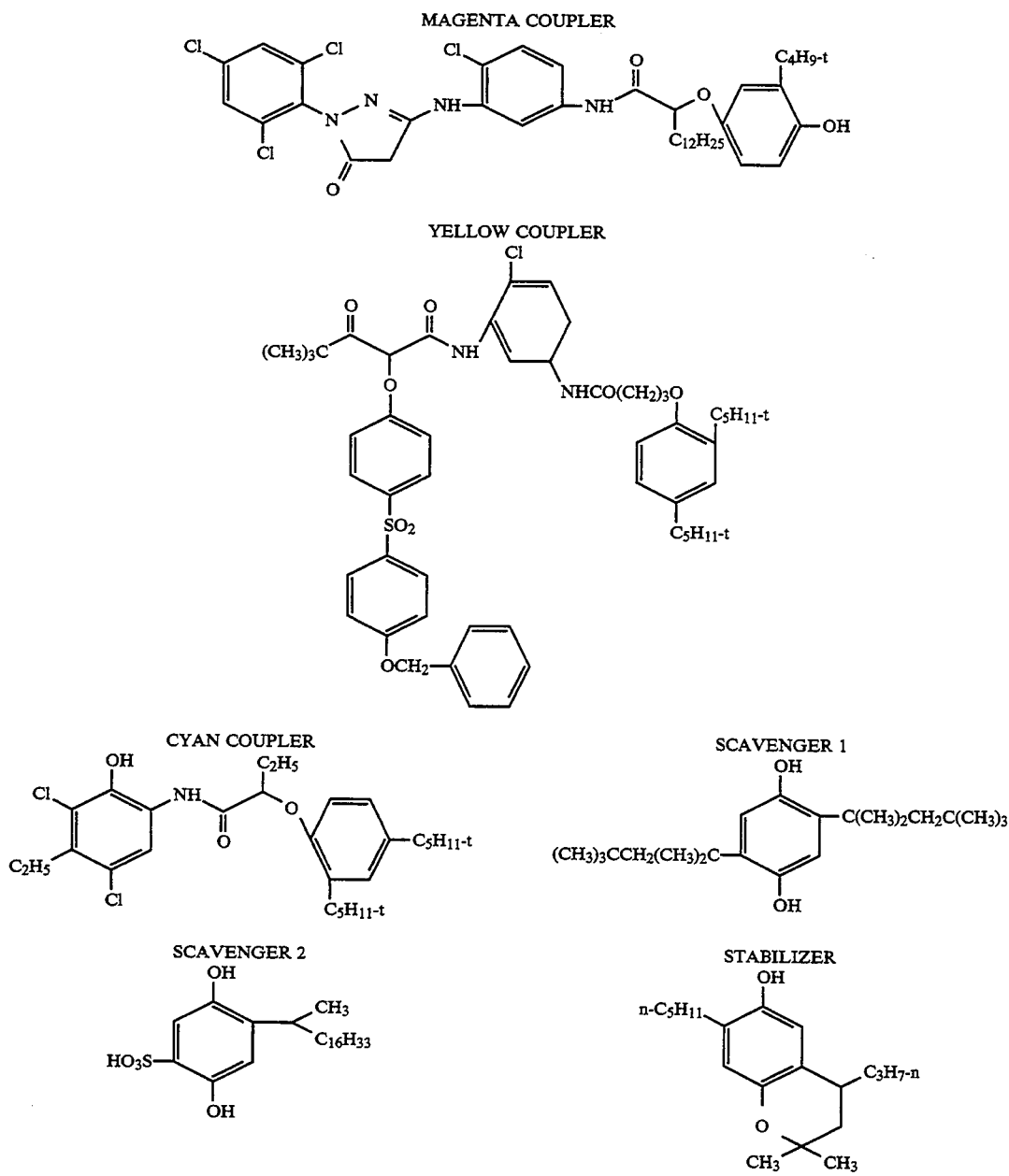

The photographic papers with the arrangement described above were processed by the well-known RA-4 process (see *Research Disclosure I*, p.933). Fresh Dmin and image dye stability, which are two major advantages of photographic elements of the present invention, were evaluated as outlined below.

(a) Fresh Dmin

Fresh Dmin is the blue density in the unexposed area of the photographic element, which is a very important property of photographic paper. The value of Fresh Dmin should be as low as possible. Because of the good spectral absorptions characteristics of polymeric UV absorbers used in the photographic elements of the present invention, the fresh Dmin values of the photographic elements of the present invention are better than those using comparative UV absorber compositions, as shown in Table 2.

TABLE 2

| Sample No. | Fresh Dmin | Remarks |
|---|---|---|
| C-1 | 0.091 | Comparative |
| C-2 | 0.094 | Comparative |
| C-3 | 0.088 | Comparative |
| C-5 | 0.117 | Comparative |
| C-6 | 0.113 | Comparative |
| C-8 | 0.090 | Comparative |
| C-9 | 0.104 | Comparative |
| C-11 | 0.089 | Comparative |
| P-1 | 0.080 | Invention |
| P-2 | 0.083 | Invention |
| P-3 | 0.080 | Invention |
| P-4 | 0.086 | Invention |
| P-5 | 0.081 | Invention |
| P-6 | 0.078 | Invention |
| P-7 | 0.081 | Invention |
| P-9 | 0.081 | Invention |
| P-10 | 0.078 | Invention |
| P-11 | 0.079 | Invention |
| P-12 | 0.078 | Invention |
| P-13 | 0.077 | Invention |

TABLE 2-continued

| Sample No. | Fresh Dmin | Remarks |
|---|---|---|
| P-16 | 0.080 | Invention |

Table 2 clearly shows that photographic elements of the present invention incorporating the polymeric UV absorbers with repeating units of formula I, have better fresh Dmin photographic elements incorporating comparative UV absorber compositions.

(b) Image Dye Stability

Photographic elements with the above layer structure were exposed with a step tablet wedge to three different colors (red, green, blue) on a sensitometer and subsequently processed by the RA-4 process to provide cyan, magenta, and yellow colors. The samples were subjected to a fading test with a Xenon lamp with filtered glass (50Klux),as described in Example 1. Dye density loss from the original density of 1.0 was measured and the data was used as the index for the image dye stability. Since the human eye is most sensitive to magenta color, the magenta dye stability is the most important among these three dyes. The results are shown in Table 3

TABLE 3

| Sample No. | Dye Loss | | | Remarks |
|---|---|---|---|---|
| | Cyan | Magenta | Yellow | |
| C-5 | −0.130 | −0.580 | −0.250 | Comparative |
| C-6 | −0.140 | −0.610 | −0.280 | Comparative |
| C-7 | −0.140 | −0.450 | −0.270 | Comparative |
| C-12 | −0.260 | −0.580 | −0.370 | Comparative |
| P-1 | −0.130 | −0.270 | −0.220 | Invention |
| P-2 | −0.110 | −0.280 | −0.240 | Invention |
| P-3 | −0.140 | −0.380 | −0.140 | Invention |
| P-4 | −0.120 | −0.420 | −0.140 | Invention |
| P-5 | −0.130 | −0.370 | −0.100 | Invention |
| P-7 | −0.120 | −0.390 | −0.290 | Invention |
| P-9 | −0.120 | −0.330 | −0.280 | Invention |
| P-13 | −0.130 | −0.320 | −0.260 | Invention |

Table 3 clearly shows that the photographic elements of the present invention containing polymeric UV absorbers of repeating units of the type of formula I, have better image dye stability than the comparative examples.

The advantages of photographic elements of the present invention which use polymeric UV absorbers with repeating units of formula I, compared to other monomeric and polymeric UV absorbing agents are as follows: better light stability; and better fresh Dmin; good image dye stability. Compared to elements using monomeric UV absorbers, elements of the present invention have the advantages that the overcoat used with monomeric UV absorbers is not necessary and an overall thinner coating for a UV filter layer can be used; the polymeric UV absorbers do not bloom or crystallize on storage, and are less toxic; the polymeric latexes have a smaller particle size and thus light scattering is less leading to higher Dmax; better gloss and better wet-haze.

The invention has been described in detail with particular reference to preferred embodiments, but it will be understood that variations and modifications can be effected within the spirit and scope of the invention.

We claim:

1. A silver halide color photographic element comprising a hydrophilic colloidal dispersion layer containing an ultraviolet absorber to stabilize an image dye formed from processing the element, the absorber being in the form of a homopolymer or copolymer having repeating units of formula I:

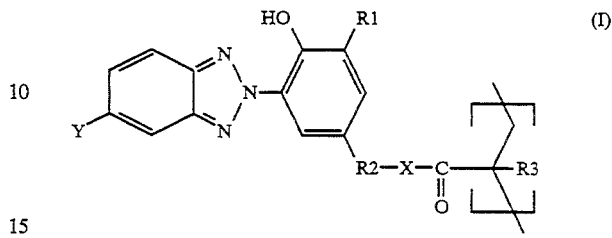

wherein:

X is O or NH;

Y is H or halogen;

R1 is selected from the group consisting of H, halogen, alkoxy , straight chain or branched alkyl group of 1 to 8 carbons;

R2 is $C_2$-$C_{10}$ alkylene which may be straight chain or branched; and

R3 is H or $CH_3$;

and wherein the molar ratio of repeating units other than formula I to repeating units of formula I, is no more than 4 to 1.

2. A color photographic element according to claim 1 wherein the ultraviolet absorber is dispersed in the layer in the form of a latex.

3. A color photgraphic element according to claim 1 wherein the hydrophilic colloidal dispersion layer comprises a gelatin gel in which the polymer is dispersed in the form of a latex.

4. A color photographic element according to claim 1 wherein the polymer is a copolymer which includes repeating units derived from acrylate, alkylacrylate, acrylamide, alykylacrylamide or vinyl aromatic monomers having a formula other than I.

5. A color photographic element according to claim 1 wherein the polymer is a copolymer additionally having repeating units of either the formula:

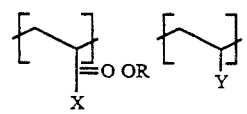

wherein X is substituted or unsubstituted amino, substituted or unsubstituted alkoxy, substituted or unsubstituted phenoxy, and Y is a substituted or unsubstituted phenyl.

6. A color photographic element according to claim 1 wherein the polymer is a homopolymer.

7. A silver halide color photographic element comprising a hydrophilic colloidal dispersion layer containing an ultraviolet absorber to stabilize an image dye formed from processing the element, the absorber being in the form of a homopolymer or copolymer having repeating units of formula I:

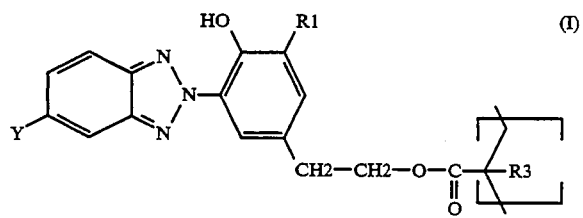 (I)

wherein:
Y is H or halogen;
R1 is selected from the group consisting of H, halogen, alkoxy, straight chain or branched alkyl group of 1 to 8 carbons;
R3 is H or CH3;
and wherein the molar ratio of repeating units other than formula I to repeating units of formula I, is no more than 4 to 1.

8. A color photographic element according to claim 7 wherein Y is H, R1 is H and R3 is CH3.

9. A color photographic element according to claim 7 wherein the ultraviolet absorber is dispersed in the layer in the form of a latex.

10. A color photgraphic element according to claim 7 wherein the hydrophilic colloidal dispersion layer comprises a gelatin gel in which the polymer is dispersed in the form of a latex.

11. A color photographic element according to claim 7 wherein the polymer is a copolymer which includes repeating units derived from acrylate, alkylacrylate, acrylamide, alkylacrylamide or vinyl aromatic monomers having a formula other than I.

12. A color photographic element according to claim 7 wherein the polymer is a copolymer additionally having repeating units of either the formula:

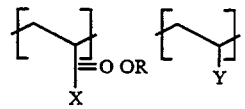

wherein X is amino, alkoxy or phenoxy, and Y is a substituted or unsubstituted phenyl.

13. A color photographic material according to claim 7 wherein the polymer is a copolymer additionally having repeating units derived from one or more monomers selected from butyl acrylate, 2-ethylhexyl acrylate, 2-ethoxyethyl acrylate, acrylic acid, methacrylic acid, acrylamide, 2-hydroxyethyl acrylate, vinyl acetate, styrene, N-vinyl-2-pyrrolidone, 2-sulfoethyl methacrylate and its metal salts, 2-acrylamido-2-methyl propane sulfonic acid and its metal salts, methyl methacrylate and t-butyl acrylamide.

* * * * *